US010235677B1

United States Patent
Sullivan et al.

(10) Patent No.: US 10,235,677 B1
(45) Date of Patent: Mar. 19, 2019

(54) DETERMINATION AND APPLICATION OF CLICK QUALITY

(75) Inventors: Gary J. Sullivan, San Francisco, CA (US); Jim Pitkow, San Francisco, CA (US); Marc Brown, Palo Alto, CA (US); Raman Chelliah, San Carlos, CA (US)

(73) Assignee: comScore, Inc., Reston, VA (US)

( * ) Notice: Subject to any disclaimer, the term of this patent is extended or adjusted under 35 U.S.C. 154(b) by 941 days.

(21) Appl. No.: 12/077,947

(22) Filed: Mar. 21, 2008

Related U.S. Application Data

(63) Continuation-in-part of application No. 11/986,311, filed on Nov. 19, 2007, and a continuation-in-part of application No. 11/890,312, filed on Aug. 3, 2007.

(60) Provisional application No. 61/007,915, filed on Dec. 15, 2006.

(51) Int. Cl.
*G06Q 30/00* (2012.01)
*H04L 12/26* (2006.01)
*H04L 29/08* (2006.01)
*H04L 29/06* (2006.01)

(52) U.S. Cl.
CPC ........ *G06Q 30/0185* (2013.01); *H04L 29/06* (2013.01); *H04L 43/00* (2013.01); *H04L 67/02* (2013.01); *H04L 67/22* (2013.01)

(58) Field of Classification Search
None
See application file for complete search history.

(56) References Cited

U.S. PATENT DOCUMENTS

| 6,437,812 B1 | 8/2002 | Giles et al. |
| 7,493,655 B2 | 2/2009 | Brown |
| 7,657,626 B1 | 2/2010 | Zwicky |
| 7,712,141 B1 | 5/2010 | Agrawal et al. |
| 8,160,924 B2 | 4/2012 | Daniels et al. |
| 8,321,269 B2 | 11/2012 | Linden et al. |
| 8,554,804 B2 | 10/2013 | Muret et al. |
| 8,572,733 B1 | 10/2013 | Rockwood |
| 2003/0105863 A1 | 6/2003 | Hegli et al. |
| 2003/0145233 A1 | 7/2003 | Poletto et al. |
| 2003/0195960 A1 | 10/2003 | Merriam |
| 2003/0225811 A1 | 12/2003 | Ali et al. |
| 2004/0117654 A1 | 6/2004 | Feldmen et al. |

(Continued)

FOREIGN PATENT DOCUMENTS

WO    WO 2005/053226 A1    6/2005

OTHER PUBLICATIONS

Binkley et al. "Ourmon and Network Monitoring Performance" FREENIX Track: 2005 USENIX Annual Technical Conference, 2005, pp. 95-108.

(Continued)

*Primary Examiner* — Alvin L Brown
(74) *Attorney, Agent, or Firm* — Baker & Hostetler LLP

(57) ABSTRACT

Rating a network interaction is disclosed. A rating system includes an interface for receiving, a rating determiner and an interface for providing. The interface for receiving receives one or more data regarding a new incoming network interaction originated from a third party device over a network. The rating determiner determines a rating of the network interaction based at least in part on the one or more data regarding the network interaction. The interface for providing provides the rating of the network interaction.

22 Claims, 5 Drawing Sheets

(56) References Cited

U.S. PATENT DOCUMENTS

| | | |
|---|---|---|
| 2004/0230476 A1 | 11/2004 | Messer |
| 2004/0254857 A1 | 12/2004 | Onizuka |
| 2006/0004633 A1 | 1/2006 | Ashbaugh |
| 2006/0026067 A1 | 2/2006 | Nicholas et al. |
| 2006/0069784 A2 | 3/2006 | Hsu et al. |
| 2006/0136294 A1* | 6/2006 | Linden et al. ............... 705/14 |
| 2006/0253578 A1* | 11/2006 | Dixon et al. ............... 709/225 |
| 2006/0259542 A1 | 11/2006 | Wu et al. |
| 2006/0265493 A1 | 11/2006 | Brindley et al. |
| 2007/0033106 A1 | 2/2007 | Mason |
| 2007/0061211 A1 | 3/2007 | Ramer et al. |
| 2007/0083519 A1 | 4/2007 | Daniels et al. |
| 2007/0192190 A1 | 8/2007 | Granville |
| 2007/0244857 A1 | 10/2007 | Yu |
| 2007/0255821 A1* | 11/2007 | Ge et al. ............... 709/224 |

OTHER PUBLICATIONS

Non-Final Office Action dated Nov. 20, 2014, U.S. Appl. No. 11/640,125, filed Dec. 15, 2006, pp. 1-22.
Final Office Action dated Jul. 23, 2015, U.S. Appl. No. 11/640,125, pp. 1-22.
Non-Final Office Action dated Sep. 11, 2015, U.S. Appl. No. 11/890,312, pp. 1-30.
Final Office Action dated Mar. 24, 2016, U.S. Appl. No. 11/890,312, pp. 1-24.
Non-Final Office Action dated Sep. 22, 2016, U.S. Appl. No. 11/640,125, pp. 1-28.
Final Office Action dated Mar. 27, 2017, U.S. Appl. No. 11/640,125, pp. 1-28.
Non-Final Office Action dated Apr. 7, 2017, U.S. Appl. No. 11/890,312, pp. 1-25.

* cited by examiner

US 10,235,677 B1

DETERMINATION AND APPLICATION OF CLICK QUALITY

CROSS REFERENCE TO OTHER APPLICATIONS

This application is a continuation in part of co-pending U.S. patent application Ser. No. 11/986,311, entitled A NETWORK INTERACTION MONITORING APPLIANCE filed Nov. 19, 2007 which is incorporated herein by reference for all purposes, which claims priority to U.S. Provisional Application No. 61/007,915, entitled A NETWORK INTERACTION MONITORING APPLIANCE filed Dec. 15, 2006 which is incorporated herein by reference for all purposes; and is a continuation in part of co-pending U.S. patent application Ser. No. 11/890,312 entitled USING A REASON CODE TO INDICATE A REASON FOR A RATING OF A NETWORK INTERACTION filed Aug. 3, 2007, which is incorporated herein by reference for all purposes.

BACKGROUND OF THE INVENTION

Revenue for Internet companies is often driven by advertising, which is typically paid out based on a network interaction (e.g., a click) on an advertisement. However, one network interaction is not equivalent to another network interaction—for example, a botnet may be developed to cause network interactions on an advertisement as compared to a user that causes a network interaction on an advertisement while surfing the net.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determination and application of a rating for a network interaction are disclosed. A rating is provided to an advertiser and/or a publisher so that an understanding can be determined of a payment between the advertiser and the publisher.

In some embodiments, a rating is used to determine a payment and/or a payment level between an advertiser and publisher. In some embodiments, a rating is used to determine the placement of an advertisement on a publishing site. In some embodiments, a rating is used to assess an advertisement.

Figure 1A:
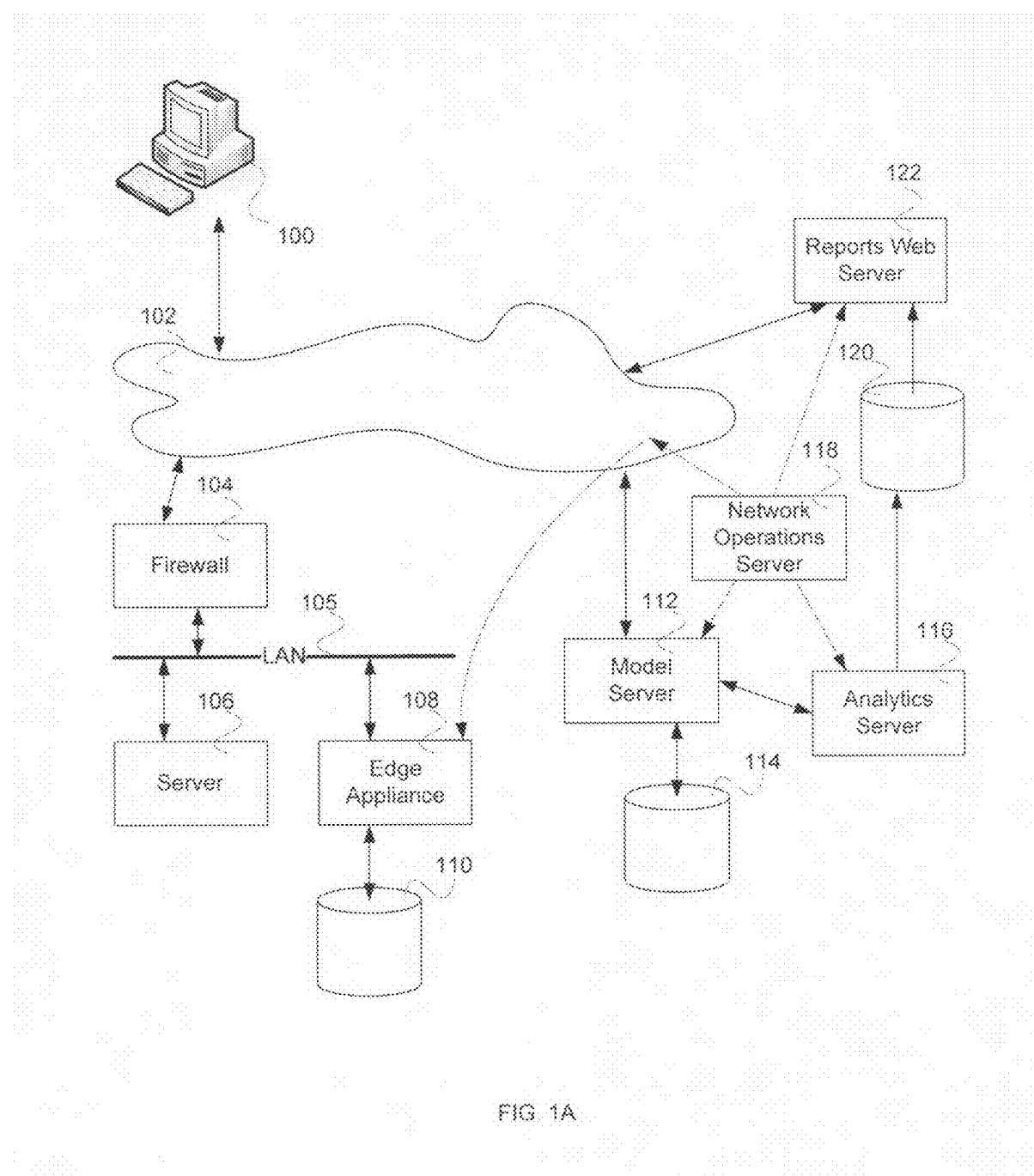
FIG. 1A is a block diagram illustrating an embodiment of a system for rating a network interaction.

FIG. 1A is a block diagram illustrating an embodiment of a system for rating a network interaction. In the example shown, computer 100 is used by a user for accessing a web page on server 106. In various embodiments, server 106 is associated with an advertising network or an advertiser. Computer 100 is able to communicate with network 102. In various embodiments, network 102 comprises one or more of the following: the Internet, a local area network, a storage area network, a wide area network, a wired network, a wireless network, or any other appropriate network. Server 106 can be accessed from network 102 via firewall 104 and local area network (LAN) 105. Edge appliance 108 is able to monitor traffic to and from server 106 and is connected to LAN 105. In various embodiments, monitoring comprises detecting in hardware the network traffic or the network interactions to be monitored, detecting in real-time network traffic, capturing data in real-time, analyzing data in real-time, triggering real-time queries or forensics of Internet protocol (IP) addresses/network topology/routing tables/preferred paths, detecting layer 3 through layer 7 data from the monitored traffic, monitoring Ethernet traffic, or any other appropriate monitoring of network traffic. Edge appliance 108 is able to store information on storage device 110. In some embodiments, edge appliance 108 monitors traffic to and from server 106 by being between server 106 and LAN 105 by receiving and forwarding all traffic between network 102 and server 106. In this situation, all traffic is received and forwarded without substantially affecting network traffic, without substantially affecting a transaction involving the network traffic, and/or with little delay (e.g., less than 2 milliseconds of delay) for the process of receiving and forwarding to make it appear as if the device is essentially not present.

In some embodiments, edge appliances can also be used to monitor traffic at other points in the network other than in front of or just beside a server—for example, on a trunk line, an internet service provider network, an advertising network, or any other appropriate traffic site.

In some embodiments, server 106 reports information regarding the network interaction. For example, a software monitor records information regarding a network interaction including a time, an IP originating address, a domain, a country, an operating system, user agent, referrer, stem portion of referrer ("referrer-stem", query portion of referrer ("referrer-query"), referrer query length, search key word, search key word frequency, etc. The software monitor forwards the information regarding the network interaction to model server 112 or analytics server 116 as appropriate to enable the use of the information to rate the network interaction. In some embodiments, where server 106 reports information regarding the network interaction, edge appliance 108 is not present.

Edge appliance 108 is able to communicate with model server 112. Edge appliance 108 periodically transmits reports and receives models from model server 112. Model server 112 can store information on storage device 114. Model server 112 forwards reports from edge appliance 108 to analytics server 116 and forwards models from analytics server 116 to edge appliance 108. In some embodiments, there are a plurality of model servers and a plurality of edge appliances, where an analytics server is able to support the communications with a plurality of model servers, and a model server is able to support the communications with a plurality of edge appliances. In some embodiments, scalability is achieved using a plurality of model servers.

Models are used by edge appliance 108 to calculate a preliminary score in real-time or quasi-real-time for detected network interactions. A preliminary score can be based on information associated with detected network interaction(s) as well as on stored parameters or models received from a model server or an analytics server such as model server 112 and analytics server 116, respectively.

Analytics server 116 stores report information to storage device 120 which acts as a data warehouse for the report information. Reports web server 122 can build reports based on the data stored in storage device 120. Network operations server 118 monitors the health and status of the system for analyzing network interactions including model server 112, analytics server 116, reports web server 122, and edge appliance 108. Network operations server 118 is able to communicate with each of the system hardware units including model server 112, analytics server 116, reports web server 122, and edge appliance 108 (in some cases directly or via the Internet with edge appliance 108 and in some cases via the Internet, through firewall 104, and via LAN 105).

In various embodiments, edge appliance 108 monitors network traffic on a local network that is separated from other networks (e.g., the Internet) by a firewall, receives network traffic from a local network and transmits the network traffic to a web server, receives network traffic from a local network that also transmits the network traffic to a web server, or receives network traffic from any other point or between any other two points appropriate for monitoring network traffic.

In various embodiments, model server 112, analytics server 116, network operations server 118, and reports web server 122 are implemented in separate servers or computer hardware units, in a single server or computer hardware unit, or any combination of separate and combined servers or computer hardware units.

In various embodiments, different combinations of model server 112, analytics server 116, and reports web server 122 are used to determine a rating for a network interaction.

Figure 1B:
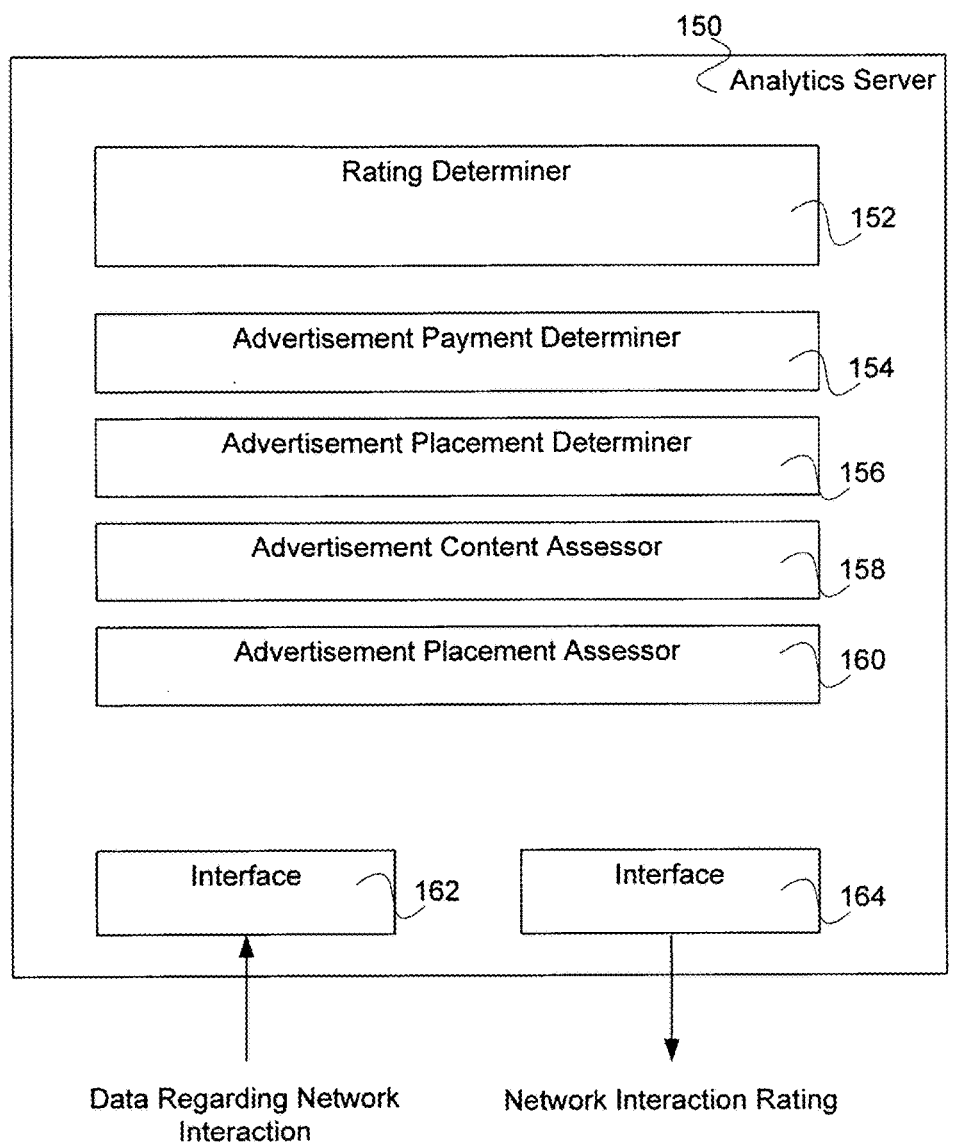
FIG. 1B is a block diagram illustrating an embodiment of a system for a server that can determine a rating.

FIG. 1B is a block diagram illustrating an embodiment of a system for a server that can determine a rating. In some embodiments, analytics server 150 of FIG. 1B is used to implement analytics server 116 of FIG. 1A. In the example shown, analytics server 150 includes rating determiner 152, advertisement payment determiner 154, advertisement placement determiner 156, advertisement content assessor 158, advertisement placement assessor 160, interface 162, and interface 164. Interface 162 receives data regarding a network interaction. Rating determiner 152 determines a rating based at least in part on data received by interface 162. Rating is provided using interface 164. Advertisement payment determiner 154 determines a payment between an advertiser and a publisher based on a determined rating. Advertisement placement determiner 156 determines a placement (e.g., publishing of an advertisement on a given page in a given location) based at least in part on a determined rating. Advertisement content assessor 158 assesses content based at least in part on a rating. Advertisement placement assessor 160 assesses placement on a publishing site or location on a page based at least in part on a rating.

Figure 2:
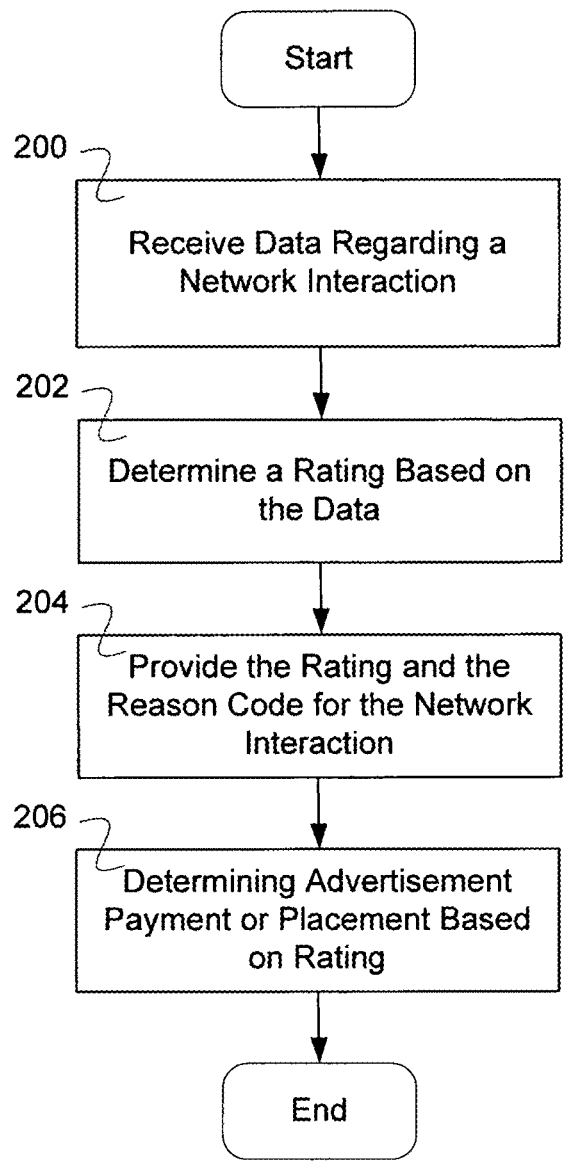
FIG. 2 is a flow diagram illustrating an embodiment of a process for rating a network interaction.

FIG. 2 is a flow diagram illustrating an embodiment of a process for rating a network interaction. In the example shown, in 200 a data is received regarding a network interaction. In 202, a rating is determined based on the data. In 204, the rating is provided for the network interaction. In 206, an advertisement payment or placement is determined based on the rating.

In some embodiments, a payment for publishing an advertisement to an advertiser by a publisher is based on a rating of a network interaction. For example, a higher quality network interaction is associated with a higher payment, and a lower quality network interaction is associated with a lower payment.

In some embodiments, the placement of an advertisement on a publisher's web page is determined by a rating of a network interaction. For example, a higher quality network interaction is shown advertisements that are associated with a higher payment to an advertiser, and a lower quality network interaction is shown advertisements that are associated with a lower payment to an advertiser. Or for another example, a network interaction that is more likely to convert (or click on an advertisement) is shown an advertisement that earns a publisher more if converted, and a network interaction that is less likely to convert is shown an advertisement that earns a publisher the same whether converted or not. In various embodiments, placement of an advertisement comprises publishing or not publishing an advertisement by a publisher, publishing in a particular location of an advertisement by a publisher, or any other appropriate placement of an advertisement by a publisher.

In some embodiments, the rating of network interactions associated with a particular advertisement enables the assessment of the content of the advertisement. For example, ratings can be used to determine which advertisements to continue with based on the quality of ratings that the advertisement attracts.

In some embodiments, the rating of the network interactions associated with a particular advertisement enables the assessment of the placement of the advertisement. For example, ratings can be used to determine which publishers to continue with based on the quality of rating that the advertisement attracts.

Figure 3:
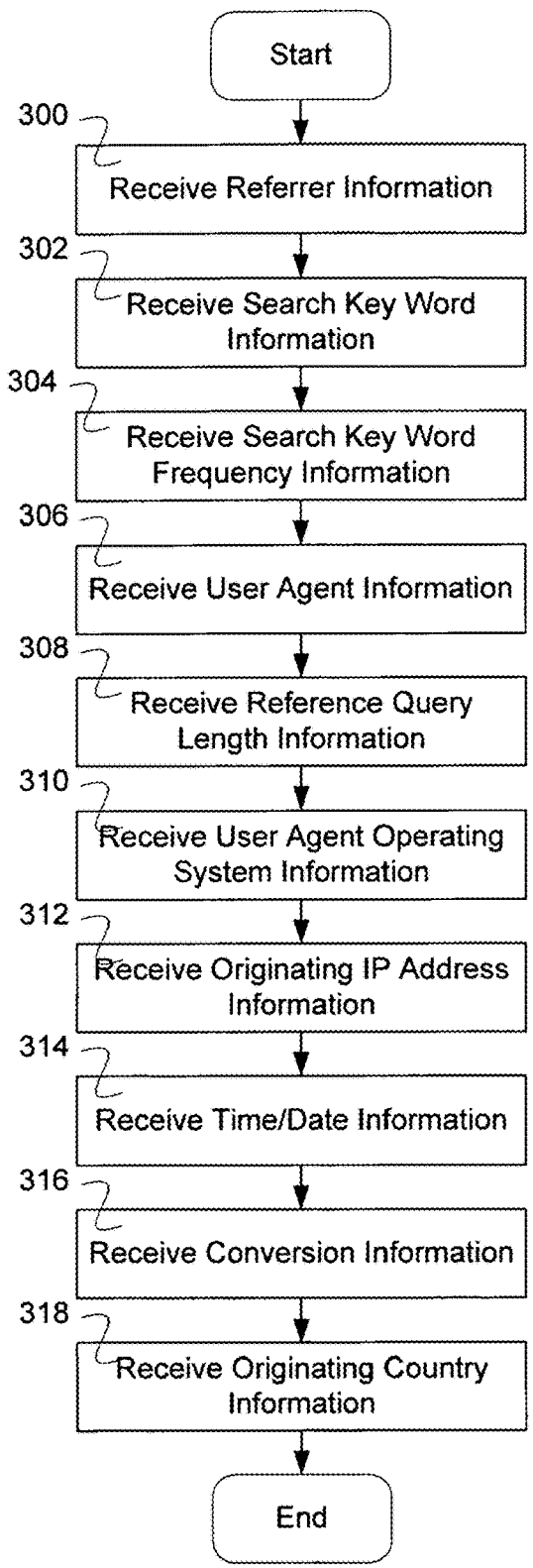
FIG. 3 is a flow diagram illustrating an embodiment of a process for receiving a data regarding a network interaction.

FIG. 3 is a flow diagram illustrating an embodiment of a process for receiving a data regarding a network interaction. In some embodiments, the process of FIG. 3 is used to implement 200 of FIG. 2. In the example shown, in 300 referrer information is received. In 302, search key word information is received. In 304, search key word frequency information is received. In 306, user agent information is received. In 308, referrer-query length information is received. In 310, user agent operating system information is received. In 312, originating IP address information is received. In 314, time and/or date information is received. In 316, conversion information is received. In 318, originating country information is received.

In various embodiments, any other relevant information (e.g., from layer 3 to layer 7) regarding a network interaction is received. In some embodiments, relevant information detected from a hardware or software detector regarding the network interaction is received and used to rate the network interaction. In some embodiments, information regarding a plurality of network interactions is used in rating a single network interaction for averaging, comparison, or any other appropriate manner of rating of a network interaction.

Figure 4:
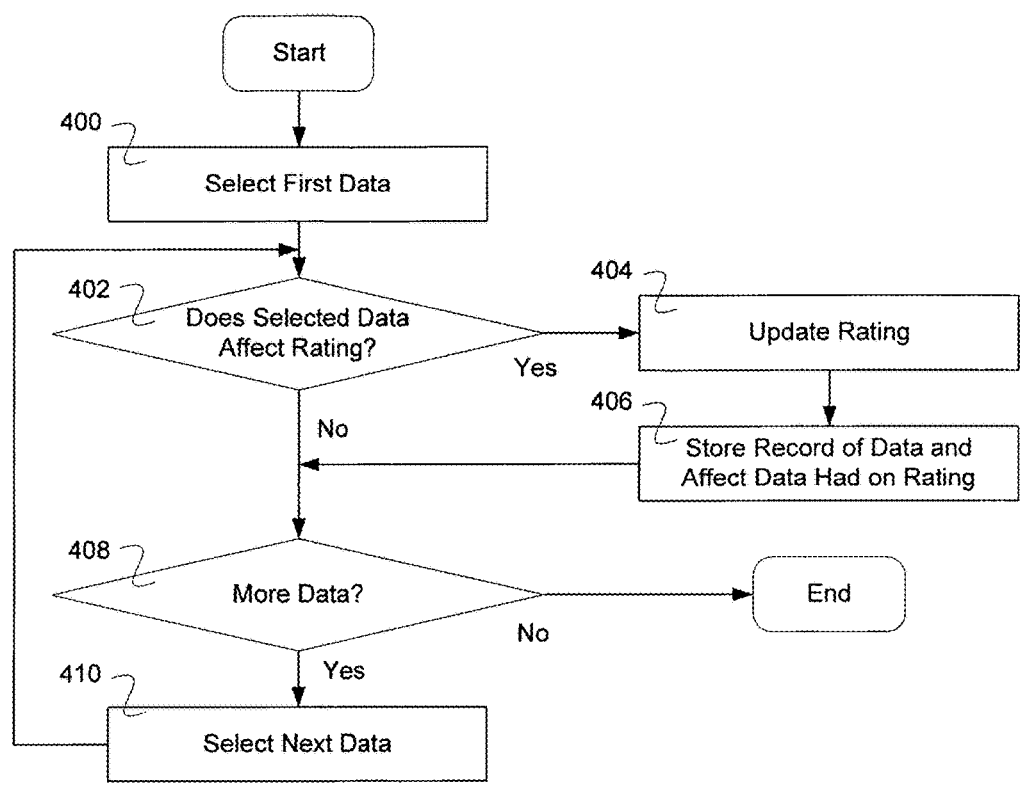
FIG. 4 is a flow diagram illustrating an embodiment of a process for determining a rating based on data.

FIG. 4 is a flow diagram illustrating an embodiment of a process for determining a rating based on data. In some embodiments, the process of FIG. 4 is used to implement 202 of FIG. 2. In the example shown, in 400 a first data is selected. In 402, it is determined if the selected data affects the rating. If the selected data affects the rating, then in 404, the rating is updated. In some embodiments, prior data is considered when updating a rating. For example, previous network interactions and the data regarding timing, sources, routes, countries, domains, IP addresses, conversions, etc. can influence the rating update. In 406, a record of the data and the affect the data had on the rating is stored, and control passes to 408. If the selected data does not affect the rating, control passes to 408. In 408; it is determined if there is more data. If there is more data, then in 410 a next data is selected, and control passes to 402. If there is no more data, then the process ends. In some embodiments, the rating comprises a graded rating (e.g., a rating with many potential values that have a relative ranking with respect to each other—such as 1, 2, 3, 4, or A, B, C, D, or −1, 0, +1, etc.). In some embodiments, the rating comprises a quality rating (e.g., excellent, good, satisfactory, neutral, poor, abysmal, etc.). In various embodiments, the rating is summarized as a positive rating (e.g., '+' or graded positive rating '++'), a neutral rating, a negative rating (e.g., '−' or a graded negative rating '−−−'), a fraudulent rating, a conversion rating (e.g., likely to convert), a letter rating (e.g., A, B, AA, B+, etc.), a number ranking (e.g., 1, 2, etc.), or any other appropriate rating.

In some embodiments, data received regarding a network interaction indicates that the network interaction is one of many recent visits from the same IP address, the rating process rates the network interaction such that the rating would decrease, whereas data received regarding a network interaction that indicates that the network interaction is one of many recent visits from the same IP address during which conversions and/or purchases have been made, the rating for the network interaction would increase. In this example, the rating system has ratings that increase for a better/desirable network interaction and decrease for worse/undesirable network interactions.

In various embodiments, a rating calculation is based on empirical and/or statistical models of network interactions and outcomes (i.e., conversions and/or purchases). In various embodiments, a rating calculation is based on a series of business rules which in turn rely on statistical models, do not rely of statistical models, rely on empirical models, or any other appropriate basis for ratings.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for rating a network interaction, the system comprising:
    an edge appliance connected between a local area network and one of an advertising network server or an advertiser server, wherein the edge appliance is configured to monitor traffic associated with the one of the advertising network server or the advertiser server, the edge appliance is configured to receive data regarding a plurality of incoming network interactions originated from one or more third party devices over a network, and the edge appliance is configured to generate a preliminary score for the plurality of incoming network interactions;
    an analytics server configured to:
        receive, over a network, the preliminary score and the data from the edge appliance,
        generate a rating of the plurality of incoming network interactions based at least in part on the preliminary score and the data,
        decrease the rating when at least one of the plurality of incoming network interactions is one of a plurality of network interactions not associated with a conversion or a purchase, and
        increase the rating when at least one of the plurality of incoming network interactions is one of a plurality of network interactions associated with a conversion or a purchase; and
    an interface configured to provide the rating of the plurality of incoming network interactions.

2. The system as in claim 1, wherein the analytic server is further configured to determine an advertising payment based at least in part on the rating.

3. The system as in claim 1, wherein the analytic server is further configured to determine an advertisement placement based at least in part on the rating.

4. The system as in claim 1, wherein the analytic server is further configured to assess an advertisement content based at least in part on the rating.

5. The system as in claim 1, wherein the analytic server is further configured to assess an advertisement placement based at least in part on the rating.

6. The system as in claim 1, wherein the data comprises data from monitored traffic.

7. The system as in claim 1, wherein the data comprises data derived from layer 3 through layer 7 data.

8. The system as in claim 1, wherein the plurality of incoming network interactions comprises a click.

9. The system as in claim 1, wherein the rating comprises a graded rating.

10. The system as in claim 1, wherein the rating comprises a quality rating.

11. A method of providing a quality rating for network interactions, the method comprising:
    monitoring, at an edge appliance connected between a local area network and one of an advertising network server or an advertiser server, traffic associated with the one of the advertising network server or the advertiser server;
    receiving, at the edge appliance, data regarding a plurality of incoming network interactions;
    determining, at the edge appliance, a preliminary score of the plurality of incoming network interactions based on a model received from a model server;
    transferring the preliminary score and the data from the edge appliance to an analytics server over a network;

generating, at the analytics server, a rating of the plurality of incoming network interactions based at least in part on the preliminary score and the data;

decreasing, at the analytics server, the rating when at least one of the plurality of incoming network interactions is one of a plurality of network interactions not associated with a conversion or a purchase;

increasing, at the analytics server, the rating when at least one of the plurality of incoming network interactions is one of a plurality of network interactions associated with a conversion or a purchase; and providing the rating of the plurality of incoming network interactions.

12. The method as in claim 11, further comprising determining an advertising payment based at least in part on the rating.

13. The method as in claim 11, further comprising determining an advertisement placement based at least in part on the rating.

14. The method as in claim 11, further comprising assessing an advertisement content based at least in part on the rating.

15. The method as in claim 11, further comprising assessing an advertisement placement based at least in part on the rating.

16. The method as in claim 11, wherein the data comprises data from monitored traffic.

17. The method as in claim 11, wherein the data comprises data derived from layer 3 through layer 7 data.

18. The method as in claim 11, wherein the plurality of incoming network interactions comprises a click.

19. The method as in claim 11, wherein the rating comprises a graded rating.

20. The method as in claim 11, wherein the rating comprises a quality rating.

21. A computer program product for rating network interactions, the computer program product being embodied in a non-transitory computer readable medium and comprising computer instructions for:

monitoring, at an edge appliance connected between a local area network and one of an advertising network server or an advertiser server, traffic associated with the one of the advertising network server or the advertiser server;

receiving, at the edge appliance, data regarding a plurality of incoming network interactions originated from one or more third party devices over a network;

determining, at the edge appliance, a preliminary score of the plurality of incoming network interactions based on a model received from a model server;

transferring the preliminary score and the data to an analytics server over a network;

generating a rating of the plurality of incoming network interactions based at least in part on the data;

decreasing the rating when at least one of the plurality of incoming network interactions is one of a plurality of network interactions not associated with a conversion or a purchase;

increasing the rating when at least one of the plurality of incoming network interactions is one of a plurality of network interactions associated with a conversion or a purchase; and providing the rating of the plurality of incoming network interactions.

22. The system as in claim 1, wherein the rating is related to a commercial value of the plurality of incoming network interactions.

* * * * *